(12) United States Patent
Borucki

(10) Patent No.: US 7,839,496 B2
(45) Date of Patent: Nov. 23, 2010

(54) CONFOCAL MICROSCOPY PAD SAMPLE HOLDER AND METHOD OF HAND USING THE SAME

(75) Inventor: Leonard J. Borucki, Mesa, AZ (US)

(73) Assignee: Araca Incorporated, Tuscon, AZ (US)

( * ) Notice: Subject to any disclaimer, the term of this patent is extended or adjusted under 35 U.S.C. 154(b) by 358 days.

(21) Appl. No.: 12/108,720

(22) Filed: Apr. 24, 2008

(65) Prior Publication Data
US 2009/0268283 A1 Oct. 29, 2009

(51) Int. Cl.
*G01N 21/01* (2006.01)

(52) U.S. Cl. .................. 356/244; 359/391; 269/287

(58) Field of Classification Search ............. 359/391, 359/392; 356/244; 269/287; 248/901
See application file for complete search history.

(56) References Cited

U.S. PATENT DOCUMENTS

| | | | | |
|---|---|---|---|---|
| 5,438,451 A | * | 8/1995 | Schweizer | 359/393 |
| 5,838,448 A | * | 11/1998 | Aiyer et al. | 356/632 |
| 6,307,628 B1 | * | 10/2001 | Lu et al. | 356/124 |
| 7,120,553 B2 | * | 10/2006 | Benvegnu | 702/172 |
| 2010/0128276 A1 | * | 5/2010 | De Groot et al. | 356/450 |

OTHER PUBLICATIONS

Elmufdi et al., A Novel Optical Technique to Measure Pad-Wafer Contact Area in Chemical Mechanical Planarization, Material Research Society Symposium Proc. vol. 914 (2006).*

* cited by examiner

Primary Examiner—Mark Consilvio
(74) Attorney, Agent, or Firm—Sughrue Mion, PLLC

(57) ABSTRACT

The present invention is a sample holder for confocal microscopy of CMP pad samples cut or otherwise removed from either new or used CMP pads that maintains a uniform load and pressure over the part of the sample visible to the confocal microscope by placing the pad behind a transparent window and holding it against the said window by a means comprising upper transparent window retaining means having an offset adjacent the transparent window having the same or essentially the same refractive index as the pad material so that when the pad is held against the transparent window, the edges of the pad are outside the outer edge of the transparent window; lower pad retaining means to press the pad under a known/load against the transparent window, which lower pad retaining means has a size less than the size of the pad; spherical force transmitting means pressed against the lower pad retaining means;, through a load cell to measure the load transferred to the sample through lower pad retaining means, the spherical force transmitting means, the force transfer means and load cell from the posterior structural housing of the sample holder which is forced together with the said window retaining means by a force generating means; and means to adjust the known load and a method of confocal microscopy of new and used CMP pad samples to determine relative surface area and other characteristics using the said confocal sample.

27 Claims, 10 Drawing Sheets

Anterior

Posterior

CONFOCAL MICROSCOPY PAD SAMPLE HOLDER AND METHOD OF HAND USING THE SAME

FIELD OF THE INVENTION

The present invention relates to confocal microscopy pad sample holders and methods of using the same.

BACKGROUND OF THE INVENTION

Confocal microscopy is a technique for optical imaging. It uses a spatial pinhole in combination with lenses and a laser to detect that portion of the reflected laser light from the sample that lies within a narrow range of the focal plane of the lenses. The detector can only observe one small portion, or pixel, of the sample at once so images are taken from over the entire sample area to be measured at a rate of several times per second and then reconstructed into a composite image by a computer. By so doing, confocal microscopy enables operators to obtain increased image contrast, provide three dimensional images or both. This principle was expressed in U.S. Pat. No. 3,013,467 hereby totally incorporated by reference and has since been developed in numerous other publications and patents.

Because it enables users to obtain enhanced haze free three dimensional images, confocal microscopy in addition to life sciences, applications has proven particularly useful in the semiconductor industry where it has been applied to inspection of wafers and other semiconductor materials and devices.

Recently the use of confocal microscopy to study the wear characteristics of chemical mechanical polishing (CMP) pads has become important. More particularly the use of laser confocal microscopy and a transparent window to determine contact area and indirectly, the surface characteristics and topography of CMP pads and other materials has become known. Such usage is disclosed in "Application of Laser Scanning Confocal Microscopy to Surface Topography Measurement of CMP Polish Pads," D. J. Stein, D. L. Hetherington, F. B. Kaufman, J. L. Cecchi (Feb. 22-23, 1997) hereby totally incorporated by reference, "Visualization and Measurement of Contact Area by Reflectivity," E. Diaconescu and M. Glovnea, (October 2006) hereby totally incorporated by reference and "Measurement of CMP Pad Contact, Deformation and Flow Resistance: Advances in Microtexture Design and Process Predictability," by G. P. Muldowney, C. L. Elmufdi, B. Jiang, R. Palaparthi (Mar. 6-8, 2007) hereby totally incorporated by reference. The matching refractive indices of the sapphire and pad material mean that pad contact areas will show no reflection whereas pad non contact areas show reflection and interference fringes, allowing a clear contrast and determination of absolute contact area between the pad material and the transparent window to be made.

In 2006 in a paper entitled A Novel Optical Technique to Measure Pad-Wafer Contact Area in Chemical Mechanical Polishing by Carolina L. Elmufdi, Gregory P. Muldowney hereby totally incorporated by reference, it was observed that "Confocal reflectance interference contrast microscopy (C-RICM) uses a single focal plane to image the pad-wafer contact interface. A sapphire cover slip is used to provide optical transparency and to match the refractive index of the pad."

The main problem of the prior art has been, however, that to prepare CMP samples with specific surface areas has required that samples be prepared in specific shapes suitable for observation and measurement. The sample must be carefully cut to the precise shape of the transparent window not leaving any burs or other anomalies on the edge of the sample that might result in uneven support of part of the applied load and bias the contact area measurements over the rest of the sample.

Any variation in the load or more specifically the pressure on any part of the pad in general contact with the transparent window results in anomalous and erroneous results. It is essential to determine the contact area under a uniform load so such edge features must be eliminated by either preparing samples with regular edges (for testing new materials) or careful cutting and preparation of samples to eliminate edge anomalies and burs in the case of testing of used pads. This can be very time consuming and reduce both the accuracy of the results and the time efficiency of the operation.

SUMMARY OF INVENTION

The present invention relates to a sample holder for confocal microscopy of CMP pad samples cut or otherwise removed from either new or used CMP pads that maintains a uniform load and pressure over the part of the sample visible to the confocal microscope by placing the pad behind a transparent window and holding it against the said window by a means comprising upper transparent window retaining means having an offset adjacent the transparent window having the same or essentially the same refractive index as the pad material so that when the pad is held against the transparent window, the edges of the pad are outside the outer edge of the transparent window; lower pad retaining means to press the pad under a known/load against the transparent window, which lower pad retaining means has a size less than the size of the pad; spherical force transmitting means pressed against the lower pad retaining means;, through a load cell to measure the load transferred to the sample through lower pad retaining means, the spherical force transmitting means, the force transfer means and load cell from the posterior structural housing of the sample holder which is forced together with the said window retaining means by a force generating means; and means to adjust the known load. This invention also relates to a method for using a sample holder for confocal microscopy of CMP pad samples cut or otherwise removed from either new or used CMP pads that maintains a constant load over the part of the sample visible to the confocal microscope by placing the pad behind a transparent window and holding it against the said window by a means comprising upper transparent window retaining means having an offset adjacent the transparent window having the same or essentially the same refractive index as the pad material so that when the pad is held against the transparent window, the edges of the pad are outside the outer edge of the transparent window; lower pad retaining means to press the pad under a known/load against the transparent window, which lower pad retaining means has a size less than the size of the pad; spherical force transmitting means pressed against the lower pad retaining means; through a load cell to measure the load transferred to the sample through lower pad retaining means, the spherical force transmitting means, the force transfer means and load cell from the posterior structural housing of the sample holder which is forced together with the said window retaining means by a force generating means; and means to adjust the known load, to view a sample of a new or used CMP pad by confocal microscopy.

BRIEF DESCRIPTION OF THE DRAWINGS

Unless otherwise indicated, in the Figures like numbers denote the same elements throughout the Figures.

DETAILED DESCRIPTION OF THE PRESENT INVENTION

Figure 1:
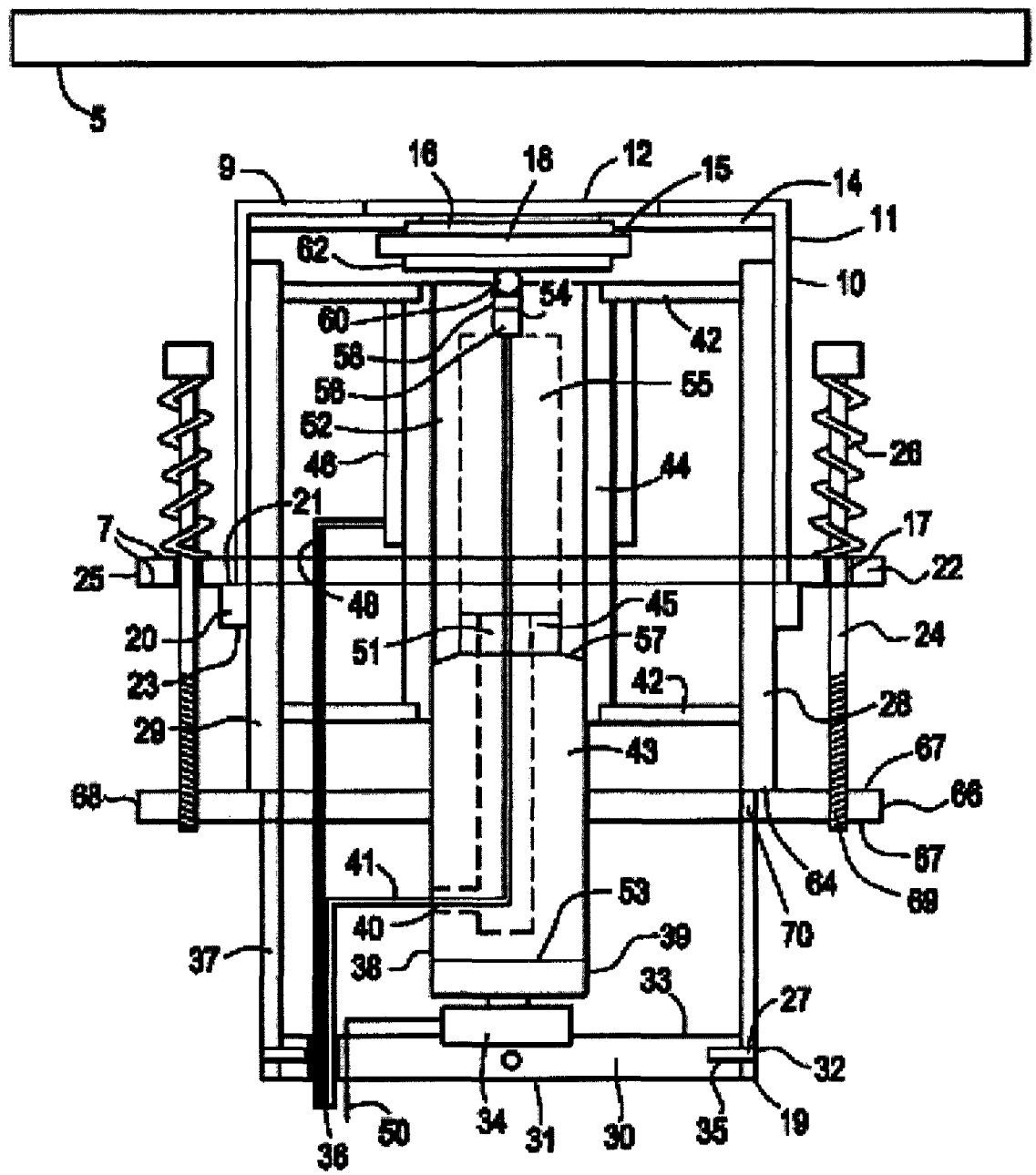
FIG. 1 is a cross sectional side view of a sample holder in accordance with the present invention.

In the present disclosure, "anterior" or "anterior direction" shall refer to the direction toward the confocal microscope when the CMP sample pad holder is in use and "posterior" or "posterior direction" shall refer to the direction away from the confocal microscope during use.

The inventor(s) of the present invention, in order to solve the problem of easily preparing a sample for observation under a confocal microscope of a polyurethane chemical mechanical polishing pad have as a result of systematic and prolonged study of the problem arrived at a solution to the problem of reliably providing a sample of a shape and under conditions suitable for observation by confocal microscopy.

More particularly they have devised a sample holder for confocal microscopy of a sample of a chemical mechanical polishing (CMP) pad at a known load wherein the pad sample is held against a transparent window of a hard material, said window held against the sample in anterior to and by means of a window mounting ring, the said window mounting ring affixed in turn to the inside bottom surface of the anterior structural housing of the sample holder, referred to as the cap, placed over the posterior housing of the sample holder, referred to as the cup, secured to a ring mounted on a step in the cup wall, the aperture of which transparent window or at least the portion within the view of the confocal microscope must be transparent and not covered by an opaque material and the remaining part of which may be covered by an opaque material—if nothing else this permits the operator of the microscope to see where to aim—, the transparent portion of which window comprises a regular curved or polygonal geometric shape, most typically a circle, square, pentagon, hexagon or any shape leaving a sufficient aperture for confocal microscopy or the like, and the portion viewed by the confocal microscope must in all parts overlay the sample which within these bounds does not have an edge or any tear hole or other anomalous feature associated with the edge of a sample and under all of which additionally the lower pad retaining means must be present opposite the transparent window, the lower pad retaining means in turn being held against the sample by a force transfer unit comprising a spherical force transmitting means supported in an opening on the anterior face of the force transmitting means which in turn comprises a force transfer unit with a plug supported in said opening in the anterior portion of the said force transfer unit, which force transfer unit is held in proper place and alignment within the cup by spacing rings and connected opposite the said spherical force transmitting means and plug to the load cell and thereby to the cup.

In addition, they devised a method for observing a sample of a chemical mechanical polishing pad at a known load by confocal microscopy by means of an apparatus wherein the pad sample is held against a transparent window of a hard material, itself held against the sample by means of a anterior window mounting ring, the window mounting ring being affixed in turn to the inside bottom surface of the cap, the aperture or portion viewable by confocal microscope of such transparent window must be transparent and not covered by an opaque material and the remaining part of which may be covered by an opaque material, the transparent portion of which window comprises a regular curved or polygonal geometric shape, preferably a circle, though a square, pentagon, hexagon or any shape leaving a sufficient aperture for confocal microscopy or the like may be used, and the portion of the transparent window viewed by the confocal microscope must in all parts overlay that part of the sample does not possess any edge or any tear, hole or other anomalous feature associated with the edge of a sample and under all of which additionally the lower pad retaining means must be present directly opposite the sample from the transparent window, the lower pad retaining means in turn being held against the sample by a force transfer unit comprising a spherical force transmitting means supported in an opening on the anterior face of the force transmitting means which in turn comprises a force transfer unit with a plug supported in said opening in the anterior portion of the said force transfer unit, which force transfer unit is held in proper place and alignment within the cup by spacing rings and connected opposite the said spherical force transmitting means and plug to the load cell and thereby to the cup.

The pad sample holder and method of the present invention may be supplemented by addition of a heating means wrapped around or adjacent to a thermally conductive spindle to control the temperature of the sample as it is measured and maintain better consistency in results and additionally measure pad samples under non-ambient conditions. A particularly attractive feature of the present invention is the enablement of the operator to know and adjust both load and temperature on the sample at the same time to cover a great variety of conditions determining not only how the pad performs under operation conditions but under a variety of other conditions as well.

The apparatus of the present invention has been developed in response to the present state of the art, and in particular, in response to the problems and needs in the art that have not yet been fully solved by currently available CMP pad sample holders for confocal microscopy. Thus, it is an overall objective of the present invention to provide CMP pad sample holders for confocal microscopy and related methods that remedy the shortcomings of the prior art.

The purpose of this device and method are to allow more effective confocal microscopy of a section of CMP pad. A CMP should be rough so that together with CMP slurry it is able to wear away and planarize the metal surface of wafers for such semiconductor wafers as silicon wafers or silicon compound wafers that have been plated with copper or tungsten or other materials and thereafter to planarize the semiconductor surface itself. They are manufactured rough and although the CMP process wears the surface of the polishing pad down making it more smooth, diamond conditioner pads used in CMP continuously make the surface of the pad rougher at the same time.

Manufacturers and users of CMP pads need to know how rough a new pad is to begin with, for new pads, and, for used pads, they need to know to what extent a pad is still rough after use for various periods of time at the loads applied during CMP. This information allows manufacturers to improve the properties of pads and discover defects such as undesired non-uniformity of roughness at different places in the pad surface or lack of adequate roughness following limited use or the like and allows users to optimize their use of a given pad type. These factors vary among different types of pads and with different CMP processes.

It has been known on the art for some time that confocal microscopes can clearly show surface contact area of a CMP pad by means of a transparent window. Since a sapphire has the a refractive index over the visible spectrum as the polyurethane material used in CMP polishing pads ranging between about 1.797 at a wavelength of 351 nm to 1.766 at a wavelength of 632.8 nm (information published by Mellesgriot at www.mellesgriot.com/product/optics/mp_3_5.htm), a dark area is visible on the transparent window where roughness peaks on the pad surface are pushed against and contact the transparent window. It is possible to observe this using confocal microscopy and this provide a means of determining the percent of surface area of the pad in contact with the transparent window and hence the relative roughness at a given load (Ibid Elmufdi & Muldowney 2006). The confocal microscopy image of a polishing pad pushed against a transparent window is divided into clearly delineated light (non-contact) and dark (contact) zones. The respective surface areas of these light and dark zones can be measured using suitable software well known to those skilled in the art or visually by means of a grid system placed on a photograph of the are viewed by the confocal microscope, the squares of which are designated as dark or light and counted to determine the relative area of the pad in contact with the transparent window. The degree to which the pad deforms under a given load is also a characteristic of the polishing pad. The pad, since it is plastic, deforms under pressure, and increased pressure increases the percent of the pad in contact with the window. This effect corresponds to actual use where, instead of being in contact with the window, the pad is in contact with the wafer.

In the prior art, when confocal microscopy was used, small pad samples roughly one half inch in size were cut from pads in use and placed on a ½ inch transparent window. It was not easy to then determine what uniform pressure was on the pad and irregularities around edge of the pad sample caused serious measurement errors. These irregularities included irregular cuts, holes and cracks in the pad which left areas of open space insuring that the load on the sample facing the transparent window was not uniform as the pad could deform into these open areas to relieve pressure and additionally because such open space features erroneously increase the apparent area of non-contact. Additionally burs on the edge of the sample resulting from cutting the sample out of the pad, if placed under the transparent window would serve to force the window away from the surface creating large and erroneous non-contact zones when the sample was viewed by confocal microscopy. Elimination of the aforementioned defects when preparing a sample for confocal microscopy has heretofore been extremely time consuming and rarely ever entirely successful.

The invention overcomes the problems of the prior art by making samples size larger, preferably at least one sixteenth of an inch beyond all the edges of the part of the transparent window that is not covered by the window mounting ring, and surrounding opaque materials that make up the cap, that is to say, the aperture of the transparent window, and preferably larger than the entire transparent window, there being no applicable maximum size of the dimensions of the sample in excess of those of the aperture or transparent window as long as the sample does not contact the walls of the cup, and applying force through the lower pad retaining means posterior to the sample which is the same shape as the aperture or very similar in shape thereto (hence everything viewed by the confocal microscope is under the same pressure and there are no anomalies), thus forcing the sample against the transparent window which is set against a window mounting ring set or fixed within the anterior part of the cap. The window mounting ring defines the aperture in that the inside open portion of the ring allows light to be transmitted to and from the transparent window and the metallic portion of the ring prevents light from being transmitted to and from the transparent window. The dimensions of the open portion of the ring define the aperture. It is not essential that the aperture be the same shape or size as the field of view of the confocal microscope, and ideally it may be slightly larger. What is important is that the entirety of the sample surface within the field of view of the microscope be pressed from the posterior side of the sample by the lower pad retaining means. For that reason it is not essential that the edge of the sample extend beyond the edge of the transparent window or that parts of the transparent window extend beyond the edge of the sample as long as all of the sample in the field of view is anterior to some portion of the lower pad retaining means and as long as there is no gap, tear, bur, or jagged edge of the sample that falls within the area anterior to said lower pad retaining means. However, since the lateral dimensions of the aperture are generally very nearly the same as the lateral dimensions of the transparent window, typically the difference is within $\frac{1}{16}^{th}$ inch, because the portion of the transparent window covered by the window mounting ring is small, as a practical matter, it is preferable that the edges of the sample extend beyond those of the transparent window so that when the sample is set against the transparent window, it is easily determined that there are no anomalous edge features such as cracks, gaps, tears, holes or burs within the field of view. As long as the entire sample extends beyond all of the edges of the transparent window, it is not essential that the sample and the transparent window have the same shape; however it is preferred that they have the same shape and this shape is, to the extent permitted by practical sample cutting methods, circular. It is also preferred that the lower pad retaining means, though its lateral dimensions need only be equal to or larger than the field of view of the confocal microscope, be the same or essentially the same as those of the transparent window. Because the lower pad retaining means is made of a hard stiff material, it is not essential that the pad retaining means have exactly the same shape as the transparent window. However, if the shape varies by much from that of the transparent window, there is a danger that the pressure of the pad on the surface of the window may vary slightly toward the edge of the pad restraining means in areas behind where the shape of the pad retaining means differs unless of course the pad retaining means is larger than the window. It is preferred that the lower pad retaining means possess the same lateral shape as the sample and the transparent window, and it is further preferred that this shape be a circle. Force is applied to the lower pad retaining means by a spherical force transmitting means force transferring means that sits on a load cell. The load cell sits on the anterior surface of the floor of the cup. The cup and cap are bolted together by spring bolts through rings held by a lip on the posterior rim of the cap and a step in the walls of the cup. As the bolts are tightened, the springs press against lip of the cap through the said ring forcing the cap further down on the cup. Since the transfer of force between the cup and the sample is through the load cell, force transferring means, spherical force transmitting means and lower pad retaining means, the load cell registers how much "load" is on the sample. The spherical force transmitting means ensures that the sample and lower pad retaining means sit optimally on the transparent window and window mounting ring. As a result, the load is uniform throughout the sample insofar as the lower pad retaining means is under all parts of the sample that are being viewed.

By rearranging the screws and adding an additional sliding bearing tube with a threaded screw (FIG. 10) it is possible to leave the first two bolts set and adjust load using only the one screw. To achieve the foregoing objective, and in accordance with the invention as embodied and broadly described herein in two embodiments a CMP pad sample holder for confocal microscopy is provided.

Through the use of the CMP pad sample holders for confocal microscopy and related methods presented herein, a microscopic observation may be rapidly carried out with a minimum of errors in the relative surface contact area observed due to irregular or burred edges of the sample. Furthermore, this enhanced microscopy may be easily and cost-effectively applied to facilitate and enhance the use of CMP polishing devices and the polishing pads used in them. These and other features and advantages of the present invention will become more fully apparent from the following description and appended claims, or may be learned by the practice of the invention as set forth hereinafter.

All dimensions for parts in the present invention follow are based on a pad size of about ½" to ⅝ inch in diameter and may be altered as needed in proportion to changes in the size of the sample used. The specific dimensions given herein are in no way limiting but are by way of example to demonstrate an effective embodiment of the invention.

As shown in FIG. 1 a cylindrical casing or cylindrical housing of a hard material called the cup 28 that is open on one end and closed on the other. The cup may be made of any material that is easily fashioned in the dimensions required by the present invention and hard plastics are preferred and polycarbonate is more preferred. In FIG. 1 is shown a circular detachable bottom 30 made of polycarbonate or other suitable hard material and having a preferred thickness of about 0.175" and with a diameter such that it fits precisely within the cylindrical walls 29 of the cup 28 and is placed so that, as may be seen in FIG. 1 the posterior face 31 of the detachable bottom 30 is even with the posterior end 19 of the cylindrical walls 29 of the cup 28.

Figure 2:
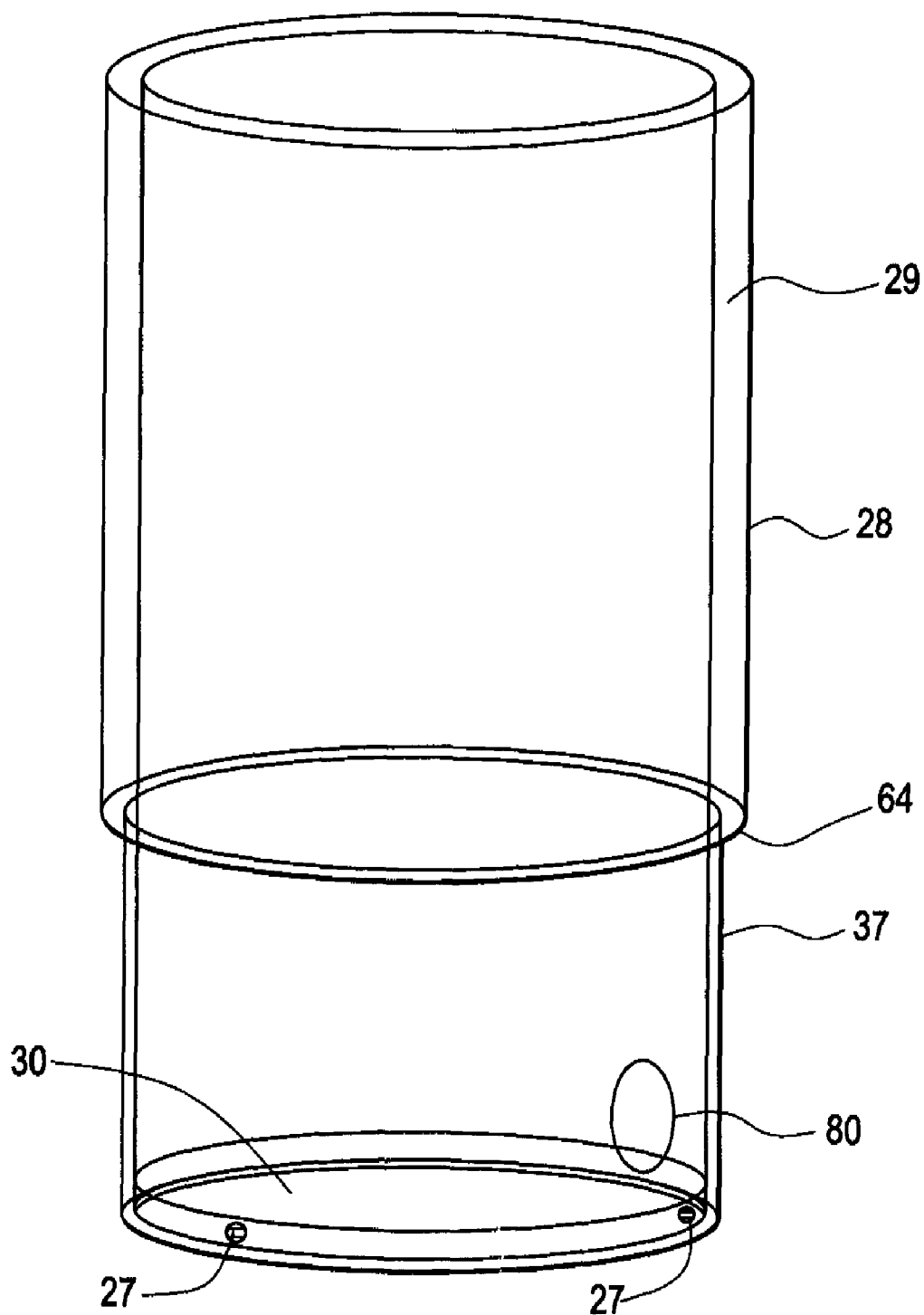
FIG. 2 shows a side view of cup 28.
Figure 3:
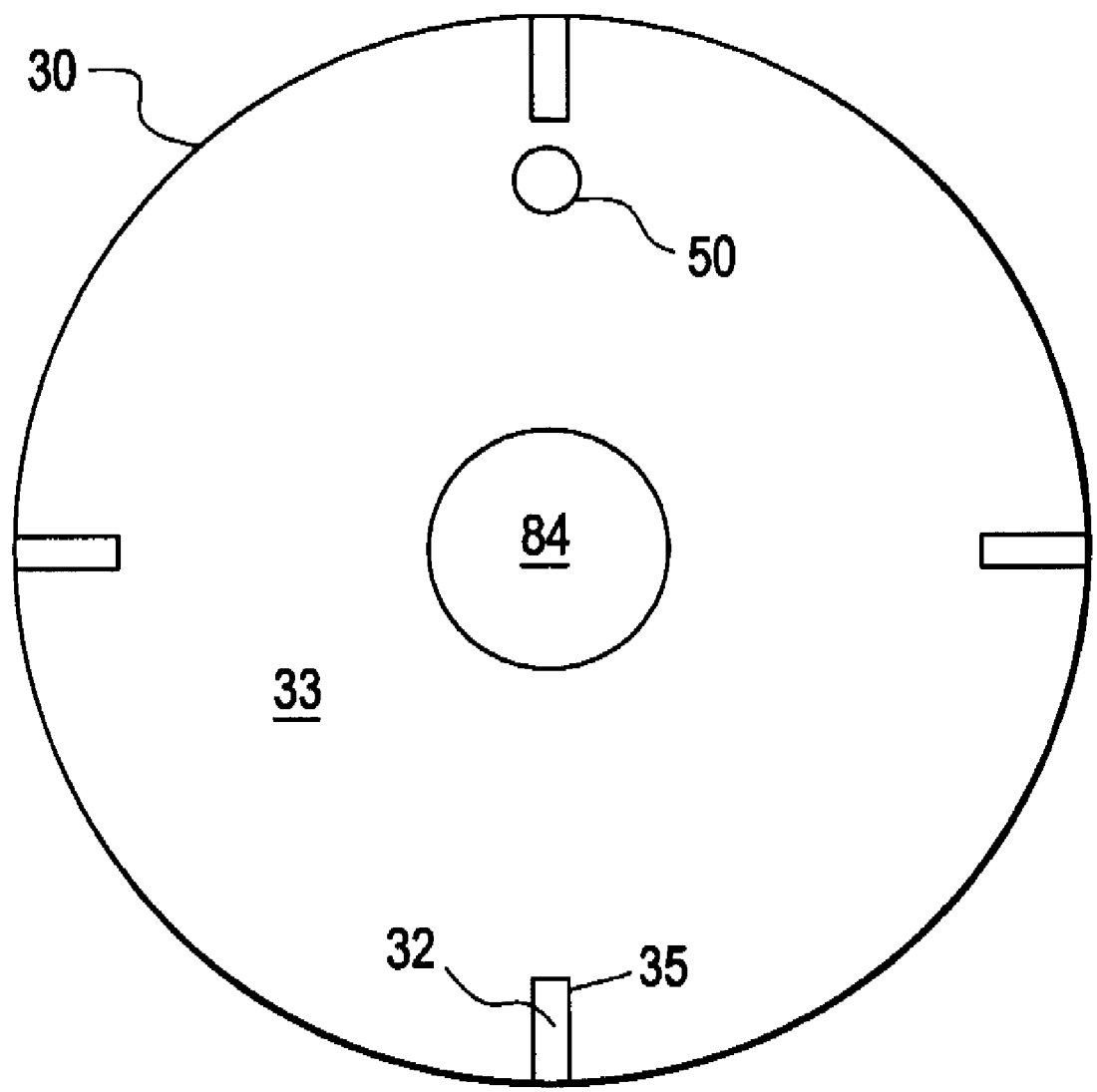
FIG. 3 shows in detail the detachable bottom 30 of the cup 28.

Referring to FIG. 3 this detachable bottom 30 possesses a depression in the center of the anterior face 33 thereof in which a load cell may be seated and affixed, a load cell 34 and cable port opening 36. Detachable bottom 30 is affixed to the cylindrical walls 29 of the cup 28 of FIG. 2 to close the end of the cup 28 by any suitable means so that it will be immobile with respect to the walls even during application of load. One preferable means comprises a number of pins 32 as seen in FIG. 3 holding the detachable bottom of the cup in place inserted through drilled holes 27 in the walls of the cup 28 as shown in FIG. 2 into drilled holes 35 in the sides of the detachable bottom 30 observed in FIG. 3. Preferably where pins 32 are used there should be at least 4 pins and at least 4 corresponding drilled holes 27.

As seen in FIG. 1, against the anterior face 33 of the detachable bottom 30 of the cup 28 a load cell 34 is affixed to a recess 84 prepared for the affixation of the load cell and the load cell 34 in turn is connected to cable 50 that passes though the an opening 36 in the detachable bottom 30.

Referring to FIG. 2, about halfway along the outside of the cylindrical walls 29 of the cup 28 is a slight step 64 perpendicular to the direction of the cylindrical walls 29 such that the cylindrical walls 29 are thinner 37 toward the posterior end 19 of the cylindrical walls 29 of the cup 28. The step 64 is about 0.01" deep and may be shallower or deeper depending on changes in the size of the device or other pertinent conditions. As may be seen in FIG. 5, the purpose of this step 64 is to hold a ring 66, the inner edge 70 of which possesses the same diameter of the outer surface of the thinner part 37 of the cylindrical walls 29 of the cup 28. The outer edge 68 of the ring 66 has a diameter of 1.2" for a sample size of about ½" to ⅝" diameter and this may also be varied according to the size of the sample and circumstances. The ring 66 is flattened with faces 67 perpendicular to the cylindrical walls 29 of the cup 28 and is 0.075" thick although the thickness may be altered as needed. As may be more clearly seen in FIG. 6 there are 2 threaded holes 69 equidistantly spaced around the ring 66 centered halfway between the inner edge 70 and outer edge 68 of the ring 66.

As seen in FIG. 1, Inside of the cup 28, set anterior to the load cell 34 is the force transfer means. The force transfer means may be any suitable means of transferring force from the load cell to the spherical force transmitting means bit a cylindrical columnar structure is made of material that will not deform or alter shape appreciably at loads contemplated in the present invention (typically 20 pounds or less) is preferred and a hollow cylindrical columnar structure is more preferred. This cylindrical columnar structure can consist of cylindrical components fashioned to fit tightly together where, as in the first preferred embodiment, it may desirable to take advantage of different material properties such as the easy workability of a plastic material such as nylon as used in hollow cylinder 43 of the nylon cylinder portion 38 of the force transfer unit 88 comprising in order from the load cell 34 and a pad 39 of steel or similar material of about 0.02" thickness and about 0.5" diameter upon which is affixed the said hollow cylinder 43 made of nylon or other suitable materials closed on either end about 0.5" in diameter and 1.0" long. The anterior face of pad 39 comprising the posterior end of the hollow cylinder 43 of the nylon cylinder portion 38 of the force transfer unit 88 rests flat against the hollow cylinder 43 and the posterior face of pad 39 rests on load cell 34.

The anterior end of the hollow cylinder 43 of the nylon cylinder portion 38 of the force transfer unit 88, which corresponds in this case to the entire force transmitting means, is walled but with a centered cylindrical protrusion 45 of 0.1" height and 0.32" diameter protruding from the anterior wall thereof. A thermocouple cable entry opening 40 is made in the lower side of the hollow cylinder 43 of the nylon cylinder portion 38 of the force transfer unit 88 and a thermocouple cable 41 passes into the hollow cylinder 43 of the nylon cylinder portion 38 of the force transfer unit 88. The openings are easy to prepare in this embodiment since the material is nylon. The anterior wall of the hollow cylinder 43 of the nylon cylinder portion 38 of the force transfer unit 88 has an opening 51 so that the thermocouple cable 41 may pass into the anterior portion 52 of the force transfer unit 88 to the opening at the anterior end 54 of the force transfer unit past the plug 56 to connect with the thermocouple 58.

The anterior portion of the force transmitting means and therefore in this embodiment the force transfer unit 52 is metallic and made preferably of copper, aluminum or steel, possesses the same external diameter as the hollow cylinder 43 of the nylon cylinder portion 38 of the force transfer unit 88, is open at the posterior end 53, and possesses an internal diameter the same as the diameter of the cylindrical protrusion 45 on the anterior wall of the nylon cylindrical protrusion 38 of the force transfer unit 88 so that the said cylindrical protrusion 45 fits tightly inside the posterior end 53 of the anterior portion 52 of the force transfer unit 88 as if it were a sleeve. It is made of these metals or some other thermally conductive material for the reason that in this embodiment a heater is included. In the event that a heater were not included any material hard enough not to be deformed under the loads contemplated under the present invention would be acceptable and, for example, nylon might be used. The tight fit between the anterior and posterior portions of the force transfer unit 88 is made to ensure the integrity of the load bearing structure. There is an opening 54 in the cylindrical protrusion 45 of the hollow cylinder 43 of the nylon cylinder portion 38 of the force transfer unit 88 through which the thermocouple cable 41 passes into the hollow interior 55 of the anterior portion 52 of the force transfer unit 88 and from which the said thermocouple cable 41 continues to run in an anterior direction along the length of said hollow interior 55.

Figure 8:
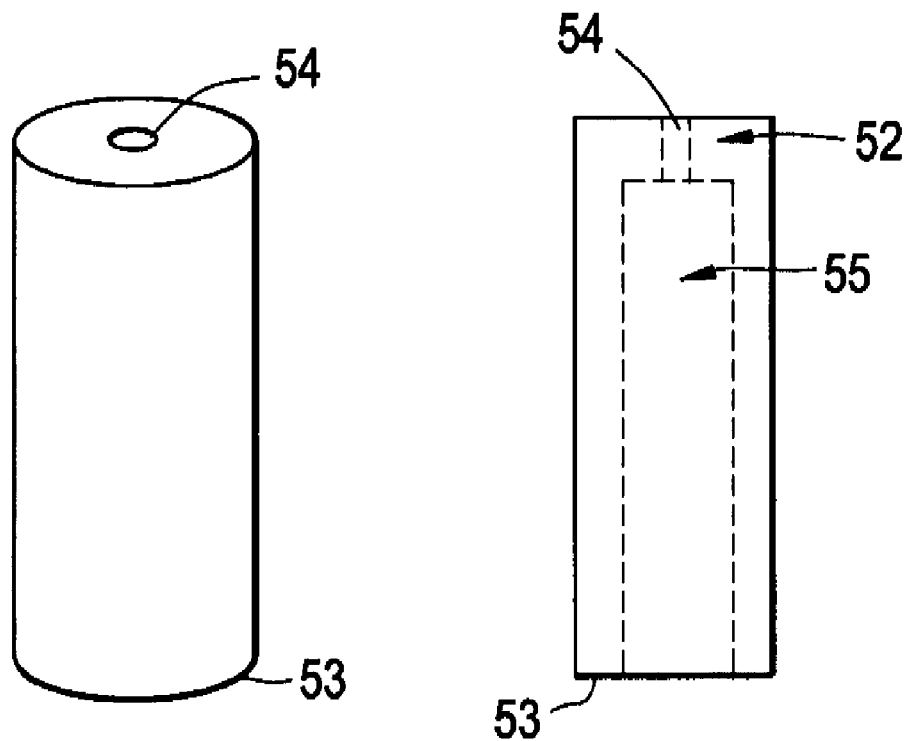
FIG. 8 is a side view of the force transfer unit.
Figure 8:
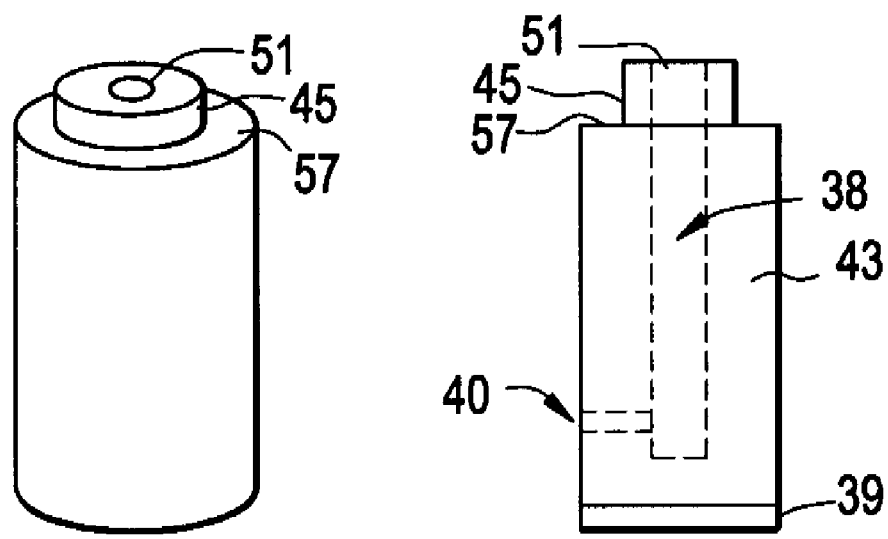

FIG. 8 shows the force transfer unit in more detail. The anterior end of the hollow cylinder 43 of the nylon cylinder portion 38 of the force transfer unit 88 is shown walled but with a centered cylindrical protrusion 45 protruding from the anterior wall thereof. A thermocouple cable entry opening 40 is seen in the lower side of the hollow cylinder 43 of the nylon cylinder portion 38 of the force transfer unit 88 and a thermocouple cable 41 passes into the hollow cylinder 43 of the nylon cylinder portion 38 of the force transfer unit 88. The anterior wall of the hollow cylinder 43 of the nylon cylinder portion 38 of the force transfer unit 88 is seen with opening 51 so that the thermocouple cable 41 passes into the anterior portion 52 of the force transfer unit 88 to the opening at the anterior end 54 of the force transfer unit past the plug 56 to connect with the thermocouple 58.

The force transfer unit shown as 52 and 53 in FIG. 1 is explained in detail in FIG. 8. As shown in FIG. 8, the anterior portion of the force transmission unit 52 has the same external diameter as the hollow cylinder 43 of the nylon cylinder portion 38 of the force transfer unit 88, is open at the posterior end 53, and possesses an internal diameter the same as the diameter of the cylindrical protrusion 45 on the anterior wall hollow cylinder 43 of the nylon cylindrical portion 38 of the force transfer unit 88 so that said cylindrical protrusion 45 fits tightly inside the posterior end 53 of the anterior portion 52 of the force transfer unit 88 as if it were a sleeve. There is an opening 54 in the cylindrical protrusion 45 of the hollow cylinder 43 of the nylon cylinder portion 38 of the force transfer unit 88 through which the thermocouple cable 41 (not shown in FIG. 8) passes into the hollow interior 55 of the anterior portion 52 of the force transfer unit 88 and from which the said thermocouple cable 41 (not shown in FIG. 8) continues to run in an anterior direction along the length of the hollow interior 55.

Also shown in FIG. 8 are pad 39, opening 40 through which the thermocouple cable 41 enters the force transfer unit 88, and the anterior wall 57 of the anterior portion 52 of the force transfer unit 88.

As can be seen in FIG. 1, in the anterior wall 57 of the anterior portion 52 of the force transfer unit 88 is an opening 0.125" in diameter 54 in which there is first a plug 56 composed of copper, aluminum, or steel or other durable but thermally conductive substance through which the thermocouple cable 41 passes and set against the said plug 56 is the thermocouple 58 but cable 41 does not pass entirely through the anterior wall 57 and thermocouple 58 is located within the wall behind ball bearing 60. The cable does not pass through the wall entirely because it is desirable to locate the thermocouple within the wall behind the ball bearing 60. The ball bearing 60 transfers heat from the heater 46 into the sheet of hard material 62 and thence into the sample 18. Anterior to the thermocouple 58 and of a very slightly larger thickness or diameter than the opening 54 but still lodged within the opening 54 is the spherical force transmitting means, which may be any spherical structure securely attached to or lodged in force transmitting means but is preferably a metallic thermally conductive spherical ball bearing the such as the thermally conductive ball bearing 60 of the preferred embodiment or other similar body. The ball bearing 60 can be made of steel or other similar suitably durable and thermally conductive materials. The spherical force transmitting means must in any event be sufficiently durable that all of the load contemplated to be transmitted to the lower pad retaining means can be transmitted thereto through the tangent point of the anterior part of the said spherical transmitting means without deforming it. The ball bearing 60 is suitable for this purpose. The diameter or thickness of the spherical force transmitting means may be any suitable dimensions provided however that the use of a ball bearing 60 slightly larger than the diameter of the opening 54 so that the ball bearing 60 may just sit or lodge in the opening 54 but may not be forced into it entirely when subjected to pressure is preferred. A spherical shape for the ball bearing is preferred but any curved or pyramidal body or the like with a single centralized point foremost in the anterior direction may be used.

The most anterior point on the surface of ball bearing 60 just touches and supports a the lower pad retaining means. The lower pad retaining means may be any means of sufficient structural integrity and durability to bear the loads contemplated in the present invention and which has a flat anterior surface of adequate dimension to support the pad and a circular hard material plate, that is to say a sheet of hard material 62 that holds the sample 18 firmly against the transparent window 16 is preferred. The sheet of hard material 62 is 0.500" in diameter and 0.03" thick though these dimensions may be varied according to the size of the sample and apparatus as a whole and it is preferably made of steel or a steel alloy and has the same shape as the transparent window. The sheet of hard material 62 need not be the same size or shape as the transparent window 16 and is not particularly limited, but it should preferably be close to the same size and shape and more preferably the corresponding later dimensions such as the diameter where applicable are preferably within the range of 20 percent smaller than those of the transparent window 16 to 20 percent larger than those of the transparent window 16. Upon the sheet of hard material 62 rests the sample 18 of a CMP pad cut or prepared so that its minimum lateral dimension or diameter is slightly greater than the corresponding dimensions of the sheet of hard material 62.

Above the sheet of hard material 62 is a transparent window 16 made of sapphire by Meller Optics, 0.500" diameter, and 0.5-2 mm thick which has essentially the same diameter or corresponding lateral dimensions as the sheet of hard material 62 and is aligned with it along an anterior posterior axis. The similar dimensions make it more likely that it will be evenly distributed throughout the sample 18. The transparent window 16 is held against the sample 18 and sheet of hard material 62 by a window retaining means which may be any means that will hold the window firmly in place under pressures resulting at the pad surface under loads contemplated in the present invention and a window mounting ring 14 the inside of which rests on the anterior face of the transparent window 16, which is 0.460" diameter and therefore smaller than the diameter of transparent window 16, and which may be made from metal such as aluminum or steel or from hard plastic or the like is preferred. The inside diameter of the window mounting ring 14 must be smaller than the diameter of the transparent window 16 to hold it securely when pressure is applied. The difference must be sufficient to ensure that the window mounting ring 14 holds the transparent window 16 securely. Any size and shape of aperture sufficient to permit undisturbed confocal microscopic viewing of the transparent window may be used but a circular shape is preferred. The window mounting ring 14 is incorporated or set into the inner face of the partially open roof or roof ledge 9 of cap 10 that is made of any suitable structural material, preferably polyvinyl chloride, and fits as a sleeve over the cup 28 to a point about 0.25" short of the ring 66 at step 64.

Figure 4:
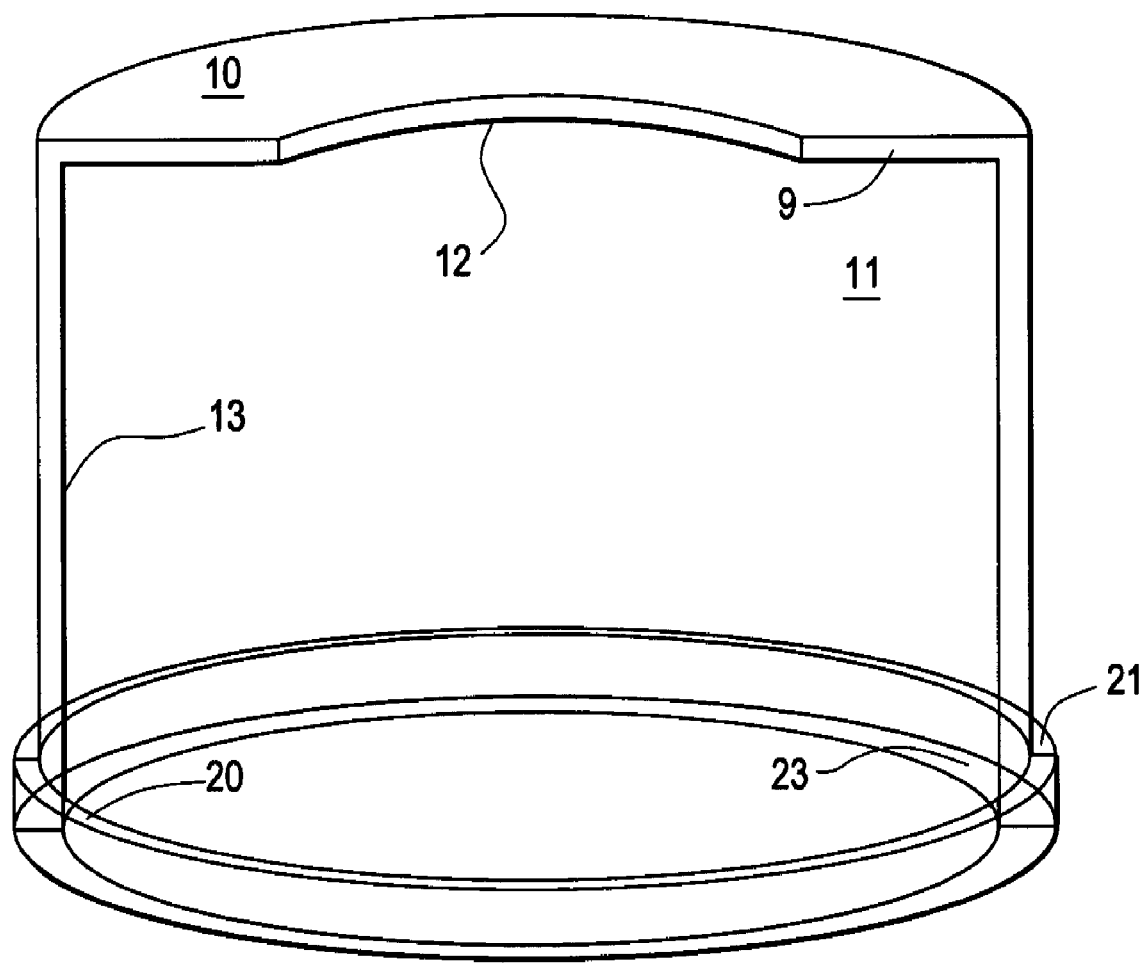
FIG. 4 is a cross sectional side view of the cap 10.

FIG. 4 illustrates cap 10 with 11 indicating the anterior portion of the cap 10 with opening 12 in roof 9 of the cap 10, 13 showing the walls of the cap, 20 the perpendicular lip of the cap, 21 the anterior flat surface of the lip 20 and 23 the posterior flat surface of the lip 20.

Figure 5:
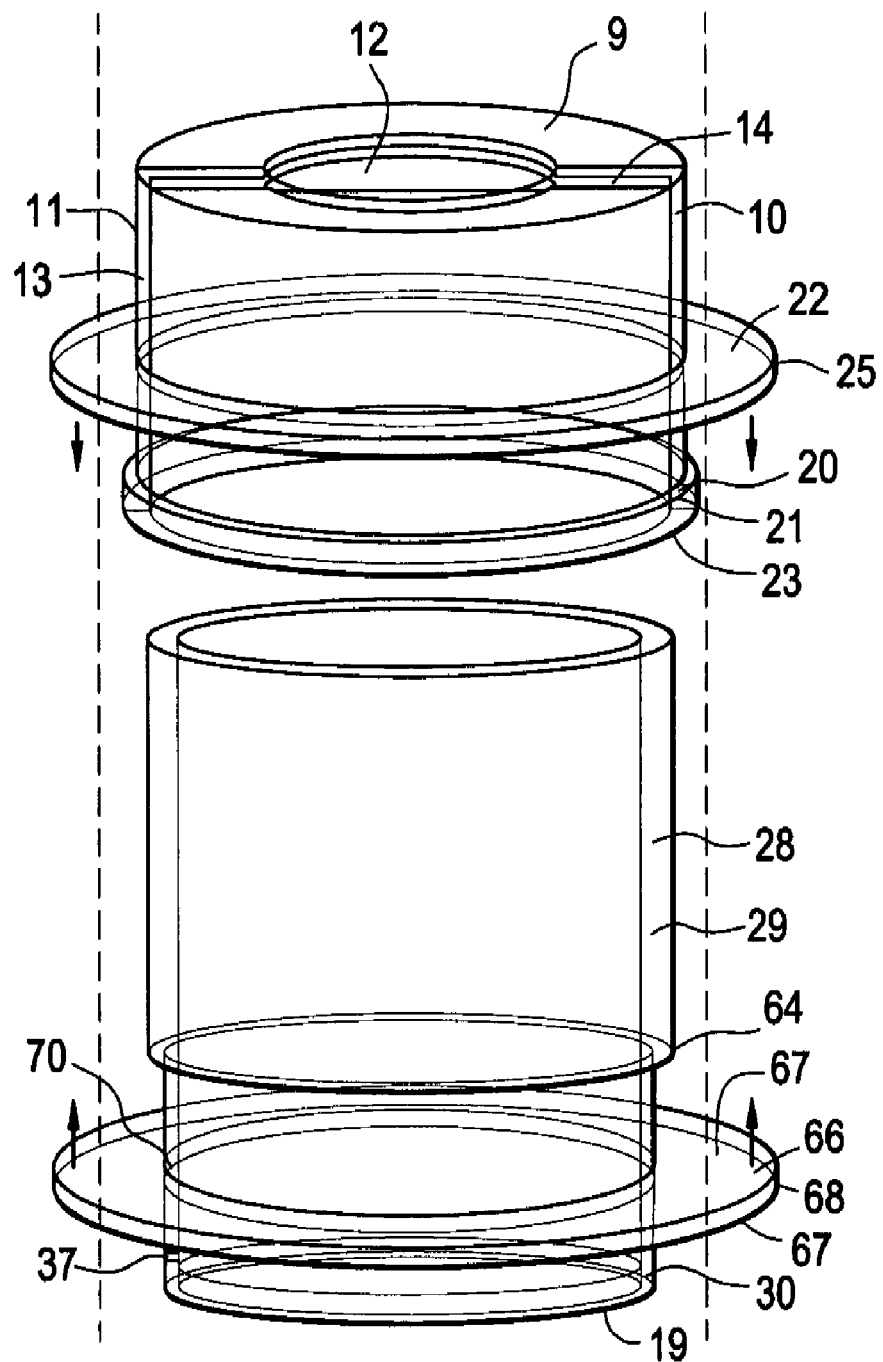
FIG. 5 is a partial cross sectional side view of the cap 10 sliding on the cup 28 with the rings 22 and 66 being placed on both the cup 28 and the cap 10.
Figure 6:
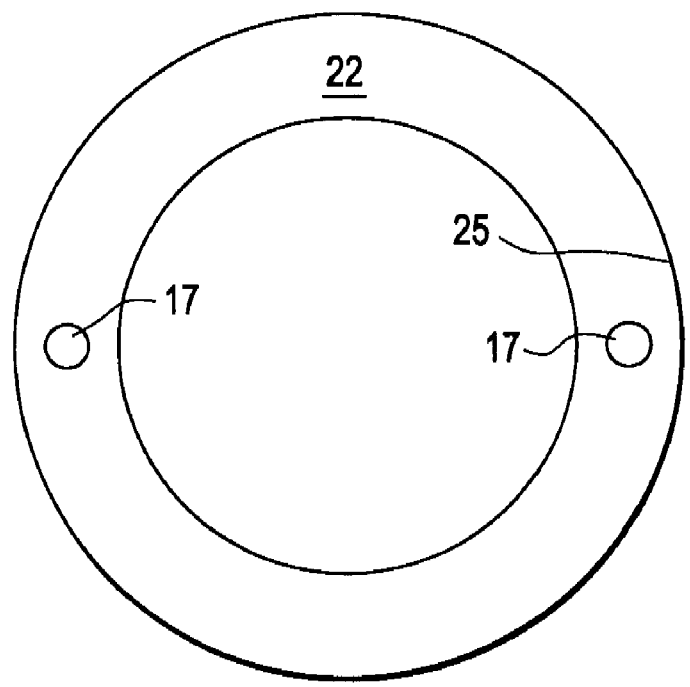
FIG. 6 is an upper view of the two rings 22 and 66.
Figure 6:
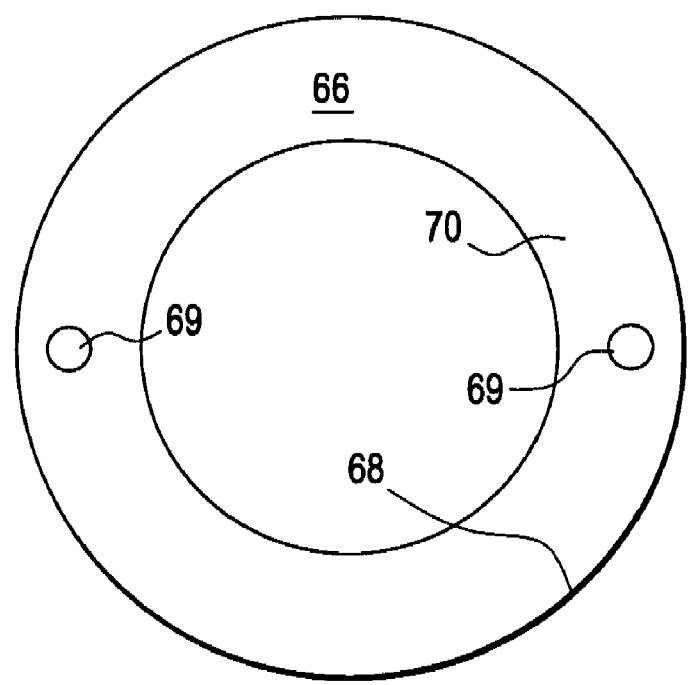

With reference to FIG. 5, lip 20 supports a ring 22 of interior diameter equal to the outer diameter of the cap 10 anterior to the lip 20 so that it may slide smoothly onto the cap as far as the lip. The anterior surface and posterior surface of the ring are flattened 7 having 0.075" thickness between them and ring 22 possesses a 1.2" outer diameter with the flat surfaces 7 coplanar with the flat surfaces 67 of said ring 66 slid onto the cylindrical walls 29 of the cup 28. The lip 20 may be an integral part of cap 10 or may be attached, but it is preferred that it be an integral part of cap 10. Since the cap and cup must be forced together to generate the load transmitted to the transparent window 16 and sample 18, the force generating means are any means that can be easily and consistently controlled and adjusted that force the cup 28 and cap 10 together. Any force generating means may be used but bolts pressed by springs attached to the cap and cup are preferred. The force transmitting means of the preferred embodiment of the present invention comprises the cap 10 the cup 28 and two rings 22 and 66 and bolts 24 and springs 26 to force the cup 28 and cap 10 together. Referring to FIG. 6 the same number of holes 17, unthreaded and slightly larger in diameter so that the threaded portion of the bolts 24 may pass through unhindered are placed in positions in ring 22, ring 22 is slid anterior to lip 20 so that these holes 17 align with threaded holes 69 in ring 66 on cup 28. Referring to FIG. 1 again, through holes 17 in the ring 22 and into the threaded holes 69 in ring 66 are inserted bolts 24 of suitable size and thread with springs 26 resting between the bolt heads and the lip 20. The springs 26 can press the lip ring 22 and via ring 22 the lip 20 and thereby the cap 10 down onto the transparent window 16 and against the sample 18, whereby the resulting force is passed to force transfer unit 88 (the combination of 52 and 53 in FIG. 1) and finally passed to the load cell 34. The bolts 24 can be tightened or loosened to position cap 10 on cup 28 so as to increase or decrease the load created by the compression of springs 26.

Figure 9:
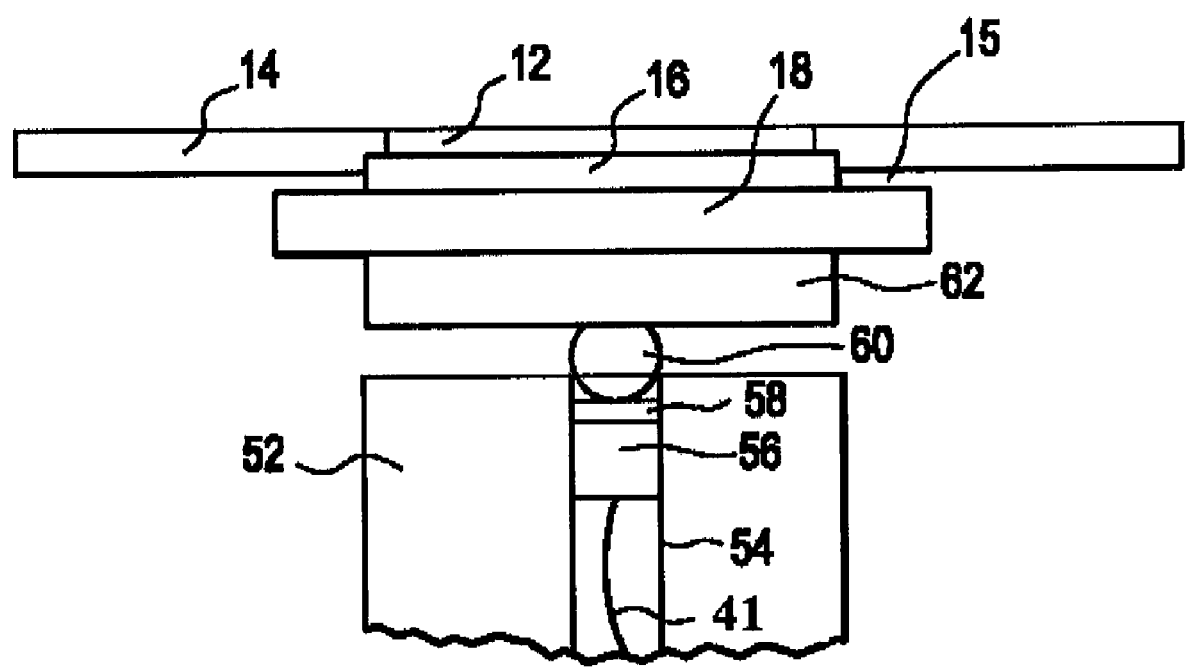
FIG. 9 is a close up cross sectional side view of the portion of the stage holding the sample.

Referring to FIG. 9, because sample 18 and transparent window 16 rest on a sheet of hard material 62 on ball bearing 60 on one side and are held by the window mounting ring 14 on the other side, if anterior portion 11 (not shown) of cap 10 (not shown) and the window mounting ring 14 are perpendicular to the walls of the cap 13 (not shown) and cup 28 has slid snuggly into the cap, the sheet of hard material 62 will rotate on the ball bearing 60 until the transparent window 16 sits completely flat on the window mounting ring 14 and this, if the window mounting ring 14 and since the roof of the cap 9 is at right angles with the walls of the cap 13 and cup 28, the surface of the transparent window 16 will be perfectly perpendicular to the walls 29 of the cup 28 and the direction of load applied and to the direction in which light is to be transmitted to the confocal microscope 5, a necessity for observing the sample.

Also shown in FIG. 9 are opening 12 in the anterior portion of the cap, offset 15 between the window mounting ring 14 and sample 18, cable 48 for the heater 46, anterior portion 52 of the force transfer unit 88, opening 54 at the anterior end of the force transfer unit 88, plug 56 at the anterior end of the force transfer unit 88 and thermocouple 58 at the anterior end of the force transfer unit 88.

Figure 7:
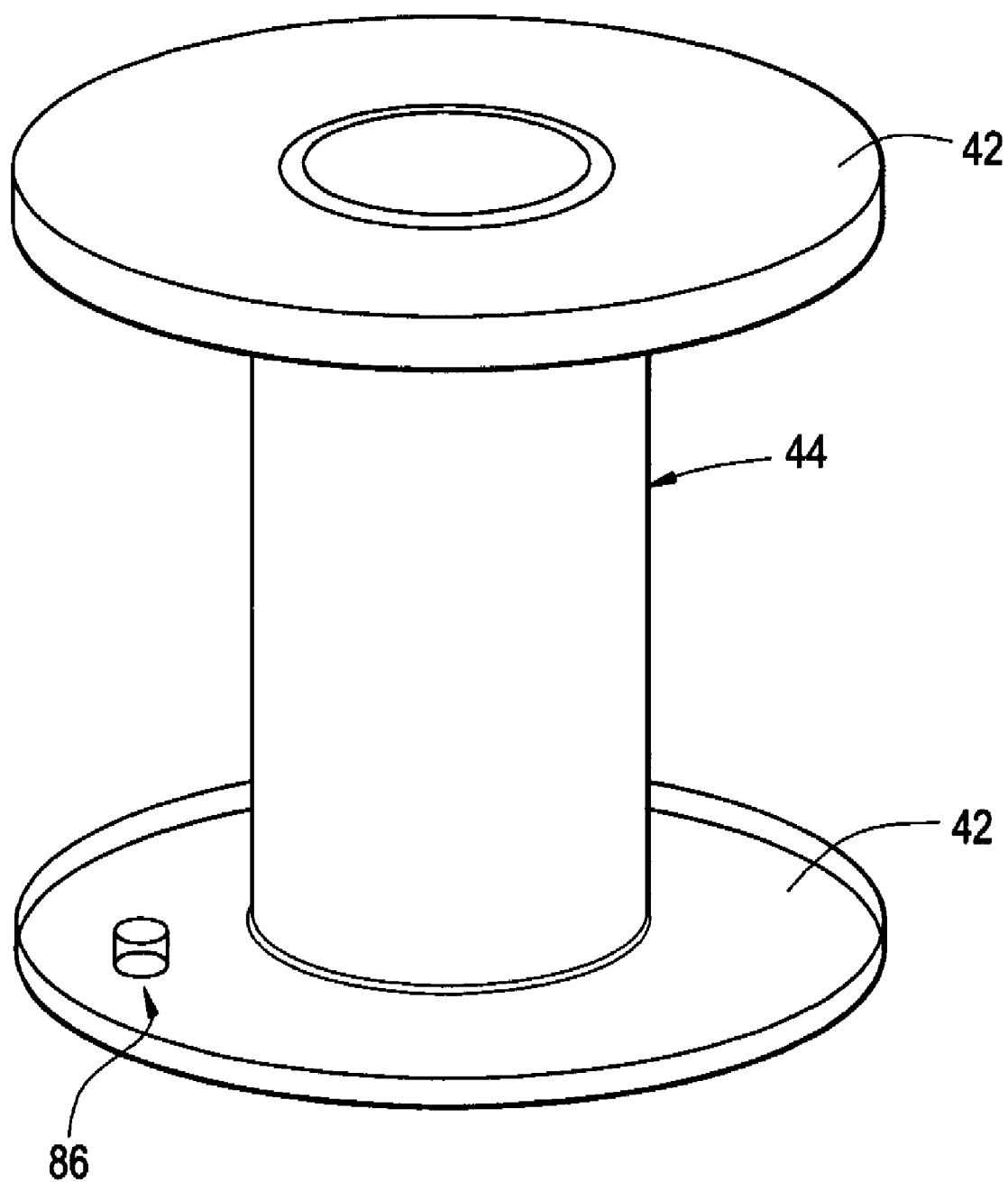
FIG. 7 illustrates spindle 87.

Finally, referring to FIG. 1 and FIG. 7, within cup 28 there is a spindle 87, the discs or spacer rings 42 of which are made of polycarbonate or material possessing similar physical characteristics and the tube 44 of which is made of or clad in copper or other thermally conductive metal or alloy. The tube 44 of the spindle is hollow and open ended and of an interior diameter just sufficiently large to hold and permit smooth movement of the anterior portion 52 of the force transfer unit 88 and hollow cylinder 43 of the nylon cylinder portion 38 of the force transfer unit 88 as a sleeve both observable in FIG. 1 so that the force transfer unit 88 of FIG. 8 can move slightly in the anterior and posterior direction. In effect only slight movability is required to allow the load to be transferred from cup bottom 30 the load cell 34 the force transfer unit 88 the ball bearing 60 and the hard sheet of material 62 to the sample 16. Because of the nature of the device, significant motion of the force transfer unit 88 would be impossible but if it is immobile the load could neither be transferred nor measured. The spacer rings 42 are made of polycarbonate sheets with a thickness of about 0.093" and are designed to serve as centering rings to hold the tube 44 and as may be seen in FIG. 1, the force transfer unit 88 inside is in perfect alignment with the anterior posterior axis and in the center of the cup 28. Around the copper cladding 85 of tube 44 of the spindle 87 may be placed a heater 46 such as a polyimide heater with the power supply cable 48 entering the opening 36 where the thermocouple cable 41 entered the cup 28 and then proceeding through opening 86 in the lower spacer ring 42 of the spindle.

Referring to FIG. 1, one object of the invention is to provide a sample 18 of a CMP pad behind a transparent window 16 which, having nearly the same refractive index as the pad, will allow confocal microscopy showing the contrast between areas of the transparent window 16 where the transparent window 16 is in physical contact with the sample 18 and areas where it is not. This difference is caused by the topography of the pad and both the structural details of the contact and the total contact area are desirable data to obtain. The present invention allows a set area and geometry of the pad to be viewed and all of it under identical and uniform load conditions. The operator may wish to recreate the load conditions on the pad during operation or try to determine variation in contact area at different loads.

Referring to FIG. 1, load is adjusted by tightening or loosening bolts 24 pressed by springs 26 and holding the cap 10 on the cup 28 as further shown in FIG. 5. Referring again to FIG. 1, as these bolts 24 are tightened, cup 28 slides further down the cup and window mounting ring 14 presses the transparent window 16 with greater force due to the load imparted by springs 26 through the apparatus against the sample 18, while ball bearing 60 holds and thereby maintains a substantially constant load on the sheet of hard material 62, and maintains sample 18 and transparent window 16 in the correct orientation with respect to confocal microscope 5. The actual load on sample 18 is transferred from sample 18 through the sheet of hard material 62, ball bearing 60 and plug 56 through the force transfer unit 88 shown in FIG. 8 or as a combination of 52 and 53 in FIG. 1 and registered by the load cell 34. The direct application of force on the load cell 34 is further guaranteed by the guidance provided by the spacer rings 42 and tube 44 of the spindle 87.

Additionally as may be seen in FIG. 9 any rough edges or burs due to the presence of which it would not otherwise be possible to apply a uniform pressure over the entirety of a sample 18 cut from a used CMP pad all exist beyond the edges of the window mounting ring 14 and are therefore invisible to the confocal microscope 5. Further if the edges of the sample 18 extend beyond those of the transparent window, then any burs that may be present will not be in physical contact with any part of the sample holder due to an open space or offset 15, created between the sample 18, the outer edge of transparent window 16 and the posterior surface of the window mounting ring 14, the dimensions of which offset being the thickness of the sample and laterally the distance to the walls 29 of the cup 28. The only portions of sample 18 visible are under a constant and uniform pressure which is can be calculated by the total load registered by load cell 34 of FIG. 1 divided by the total area of transparent window 16. Thus by knowing the pressure per square inch on the transparent window 16 from the area and the load determined by the load cell it is possible to determine what the load on the original pad would have been as well. Any pressure and therefore any load normally used in CMP polishing may be applied to the sample 18 of the present invention but pressure of between 0 and 11 pounds per square inch are preferred and pressures between $\frac{1}{5}$ pound per square inch and 10 pounds are more preferred. By matching the pressure on the transparent window 16 with pressure calculated for CMP polishing conditions (load divided by wafer area) one is enabled to recreate easily pressure conditions on the pad during use. By this means and knowing the area of the entire CMP pad in contact with the wafer, with wafer sizes currently ranging from diameters of 1 to 12 inches, the same pressure for a pad under a known load and therefore actual use conditions can be recreated in the sample holder. This is a major improvement over the existing art because heretofore it was necessary to cut very precise samples 18 with exact dimensions and exhibiting no burs, and this was time consuming and expensive. The bolts 24 enable the operator to vary the load on a sample 18 repeatedly without removing the sample 18 or dismantling the sample pad holder. This is also a major benefit to the operator of the microscope.

Referring back to FIG. 1, thermocouple 58 and heater 46 allow the operator to monitor and adjust the temperature of sample 18 during observation both to achieve a desired temperature as closely as possible corresponding for example to conditions of CMP operations with a minimum of apparatus and procedure and also to vary the temperature to observe the effects of this variation on surface contact area of the sample 18 to the transparent window 16.

Figure 10:
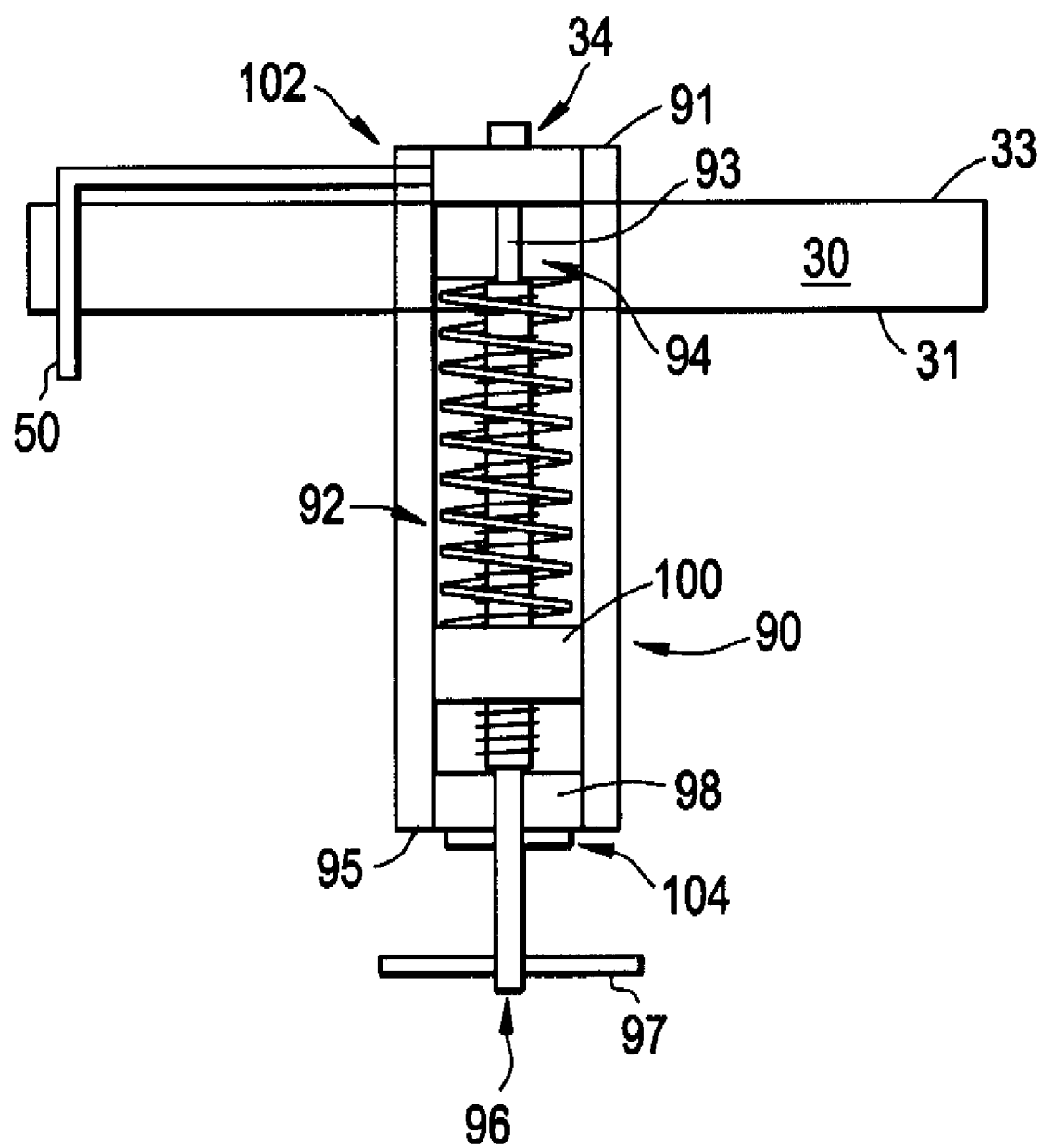
FIG. 10 is a cross sectional side view of the load applying device of the second embodiment.

The additional embodiment shown in FIG. 10 is essentially the same as the preceding embodiment. However it differs from the preceding embodiment in the following respects: in the force generating means, the spring 26 compressing bolts 24 visible in FIG. 1 that are adjusted to increase or decrease load in the preceding embodiment are left in a constant set position or the cap 10 is otherwise secured against the cup 28 both as shown in FIG. 1 by screws or other suitable means. The detachable bottom 30 of cup 28 where there is a recess 84 to hold the load cell 34 in the preceding embodiment as is shown in FIG. 1 is opened as shown in FIG. 10 to accommodate a sliding tube 90 large enough so that the inner diameter of said sliding tube 90 is the same as the outer diameter of the load cell 34 and up to 2 inches length but preferably about 1.2" and made of any durable metallic material but preferably aluminum having a diameter of up to 0.75" but preferably 0.5". The sliding tube 90 is fixed by suitable means to the detachable bottom of the cup 30. The load cell 34 is fixed inside the anterior end 91 of the sliding tube 90 with the anterior portion slightly protruding and with the cable for the load cell 50 trailing out through a slit in the side of the tube 102.

Further referring to FIG. 10, inside the said sliding tube 90 posterior to load cell 34, there is a free end bearing 94 with a diameter the same or very slightly smaller than the inside diameter of the said sliding tube 90 so that it may slide easily therewithin with a center hole 93 to receive the lubricated, smoothly machined end of a threaded shaft 96 made of metallic material and preferably brass which passes through a threaded slider 100 that is 0.1" thick made of metallic material and preferably aluminum with a slightly smaller diameter than the inner diameter of the sliding tube 90 so that it may slide smoothly therewithin and whose smoothly machined anterior end passes through a lubricated fixed end bearing 98 of about thickness 0.1" made of metallic material, preferably aluminum, fixed by any suitable means, such as friction or adhesive, to the posterior end 95 of the sliding tube 90. The machined, threaded shaft 96 is up to 2.5" long but preferably 1.5" long and is threaded through the threaded slider 100 and is turned to move the said threaded slider 100 up or down the inside of the sliding tube 90.

A single or concentric double spring 92 is placed between the threaded slider 100 and free end bearing 94 and the motion of the threaded slider 100 up the threaded shaft 96 applies load against free end bearing 94 and to the load cell 34. A single spring is a conventional spring. A double concentric spring is two springs one larger and one smaller included within the larger spring either wound the same direction or opposite to provide greater resistance to the closing of the gap between the threaded slider 100 and the free end bearing 94. Springs 92 are chosen to match the load capacity of the load cell 34 and desired change in load per threaded shaft 96 revolution. The threaded shaft 96 is fitted with a cross bar or other suitable means 97 to facilitate the application of torque and this may be applied either manually or mechanically to increase, maintain or decrease the load on the sample 18 as shown in FIG. 9. In this case, if as is now possible, the direction of the confocal sample holder is reversed from facing upward to facing downward, it is necessary to make an adjustment to take into account the weight of the load cell 34 (FIG. 1), force transfer unit 88 (FIG. 8), ball bearing 60, thermocouple 58, plug 56, sheet of hard material 62 and sample 18 (all FIG. 9) since these would now weigh down on the load cell 34 as well. This is accomplished by taking the weight of these items before construction of the cell and then adding the weight of the cut sample 18 to the sum of these other weights and then adding this to the load registered by the load cell 34 to calculate the total load on the surface of the sample 18. Since this allows the load to be adjusted from the top, it is actually a more convenient for many applications than the preceding embodiment where the orientation of the laser confocal microscope allows.

Additionally, this embodiment possesses the advantage of enabling one to change load and therefore surface pressure uniformly over the entire sample through the ball bearing by means of the single adjustment of the threaded shaft 96 which considerably simplifies that procedure.

EFFECTS OF THE INVENTION

A sample holder for confocal microscopy of a sample of a chemical mechanical polishing pad at a known load for determining surface contact area at a given load wherein the pad sample is held against a transparent window of a hard material, held against the sample in front of and by means of a window mounting ring, the said window mounting ring affixed in turn to the inside bottom surface of a cap placed over a cup and secured to a ring mounted on a stepped ledge in or alternatively part of the said cup, part of which window is exposed in the anterior direction to the confocal microscope, which portion comprises a regular curved, typically circular, or polygonal geometric shape completely encompassed by the dimensions of the sample which may also exceed in lateral dimensions the entire transparent window, which sample further rests on a sheet of hard material, pressing the sample opposite the window, the said sheet of hard material corresponding approximately to the dimensions and geometric shape of the transparent window, and in turn supported on and pressed by a force transfer unit comprising a ball bearing supported on a plug supported on a hollow shaft which may contain a thermocouple, which force transmission unit is supported within the cylindrical housing by a spindle with spacer rings and connected opposite the bearing and plug to a load cell at the posterior wall the cup.

This invention in all embodiments allows the surface contact area of a CMP polishing pad to be measured for contact area on a transparent window at known loads which can be altered easily, measurably and without removing the sample. Temperature of the sample can also be measured and adjusted during microscopy. This provides the operator with far more precise reliable data about the surface conditions of the CMP pad with much greater convenience.

Furthermore, in the second embodiment where the load is applied by a threaded shaft housed in a sliding tube, one end of which tube is affixed to the bottom of the cup, said threaded shaft passing through a fixed end bearing affixed to the other end of the said sliding tube, a threaded slider fit within the tube with a single or concentric spring between the load cell and the shaft and a free end bearing sitting under the load cell and transferring load thereto, the load can be changed by turning a single bolt. This allows adjustment while the stage is attached to the confocal microscope and additionally can easily allow continuous and incremental adjustment of load by either manual or mechanical means.

DETAILED DESCRIPTION OF THE DRAWINGS

FIG. 1 is a cross sectional side view of the sample holder.
5 is the confocal microscope.
7 are the flat surfaces of ring 22
9 is the roof or roof ledge of the cap.
10 is the cap.
11 Anterior portion of the cap.
12 is the opening in the anterior portion of the cap.
13 are the walls of the cap.
14 is the window mounting ring.
15 is the offset between the window mounting ring and sample.
16 is the transparent window.
17 are the unthreaded holes in ring 22.
18 is the sample.
19 is the posterior end of the cylindrical walls of the cup.
20 is the lip of the cap.
21 is the anterior flat surface of the lip.
22 is the ring with unthreaded holes resting on the anterior flat surface of the lip of the cap.
23 is the posterior flat surface of the lip.
24 are the threaded bolts for applying load.
25 is the outer rim of ring 22.
26 are the springs for bolts 24.
27 are the drilled holes in the cylindrical walls of the cup.
28 is the cup.
29 are the cylindrical walls of the cup 28.
30 is the detachable bottom of the cup
31 is the posterior face of the detachable bottom of the cup.
32 are the pins holding the detachable bottom of the cup in place.
33 is the anterior face of the detachable bottom of the cup.
34 is a load cell.
35 are drilled holes in the sides of the detachable bottom of the cup.
36 is an opening to allow cables to enter the cup.
37 is the thinner portion of the cylindrical walls of the cup 29.
38 is the nylon cylinder portion of the force transfer unit 88.
39 is the pad.
40 is the hole allowing the thermocouple cable to enter the force transfer unit 88.
41 is the thermocouple cable.
42 are the spacer rings to hold the force transfer unit guide tube in place.
43 is the hollow cylinder in the nylon cylinder portion 38 of the force transfer unit 88.
44 is a force transfer unit guide tube supported by the spacer rings 42 that hold the force transfer unit in place
45 is the cylindrical protrusion from the anterior surface of the nylon cylinder portion 38 of the force transfer unit 88.
46 is a heater.
48 is a cable for the heater.
50 is a cable for the load cell.
51 is an opening in the anterior wall of the hollow cylinder 43 of the nylon cylinder portion 38 of the force transfer unit 88.
52 is the anterior portion of the force transfer unit
53 is the posterior end of the force transfer unit 88.
54 is an opening at the anterior end of the force transfer unit 88.
55 is the hollow space inside the anterior portion of the force transfer unit.
56 is a plug at the anterior end of the force transfer unit.
57 is the anterior wall of the posterior end 53 of the force transfer unit 88.
58 is a thermocouple at the anterior end of the force transfer unit.
60 is a ball bearing at the anterior end of the force transfer unit.
62 is a sheet of hard material resting under the sample 18.
64 is the step in the thickness of the cylindrical walls 29 of the cup 28.
66 is a ring with threaded holes 69 that rests on the step in the wall of the cup 64.
67 are the flat surfaces of ring 66.
68 Is the outer edge of ring 66.
69 Threaded holes in ring 66.
70 Inner edge of Ring 66.
FIG. 2 shows the side view of the cup 28.
80 is an opening for ambient cooling
Otherwise numerals here refer to the same things as in FIG. 1

FIG. 3 shows the detachable bottom 30 of the cup 28
84 is the recess for aligning load cell 34
Otherwise numerals here refer to the same things as in FIG. 1

FIG. 4 is a cross sectional side view of the cap.
Otherwise numerals here refer to the same things as in FIG. 1.

FIG. 5 is a partial cross sectional rule view of the cap sliding on to the cup 28 with the rings being placed on both cup 28 and cap 10.

Otherwise numerals here refer to the same things as in FIG. 1

FIG. 6 is an upper view of the two rings.

Otherwise numerals here refer to the same things as in FIG. 1.

FIG. 7 shows spindle 87 composed of the spacer rings 42 and the thermally conductive guide tube 44 with copper cladding 85 and an opening 86 for cable access to the heater cable 48 not shown in this Figure.

FIG. 8 is a side view of the force transfer unit 88 comprising the anterior conducting portion 52 and the nylon cylinder posterior portion 38.

Otherwise numerals here refer to the same things as in FIG. 1.

FIG. 9 is a close up cross sectional side view of the portion of the stage holding the sample 18.

Otherwise numerals here refer to the same things as in FIG. 1.

FIG. 10 is a cross sectional side view of the load applying device of the second embodiment.

90 is the sliding tube.
91 is the anterior end of the sliding tube.
92 is the spring.
93 is the center hole.
94 is the free end bearing.
95 is the posterior end of the sliding tube.
96 is the threaded shaft with smoothly machined ends.
97 is the cross bar to facilitate turning of the threaded shaft.
98 is the fixed end bearing in the sliding tube.
100 is the threaded slider.
102 is the slit at the side of the tube for the load cell cables.
104 is the retaining washer fixed to the threaded shaft.

What is claimed is:

1. A sample holder for confocal microcopy of a chemical mechanical polishing pad (CMP) sample cut or otherwise removed from either a new or used CMP pad that maintains a uniform load and pressure over the part of the sample visible to a confocal microscope by placing the sample behind a transparent window and holding it against the said window, the sample holder comprising:

means for retaining an upper part of the transparent window which has an offset adjacent the transparent window having the same or essentially the same refractive index as the sample so that when the sample is held against the transparent window, the edges of the sample are outside an outer edge of the transparent window;

means for retaining the lower part of the sample which presses the sample under a known load against the transparent window, which means possesses lateral dimensions the same as or less than the corresponding dimensions of the sample;

means for transmitting a force via a spherical member pressed against the means for retaining the lower part of the sample, the force being transmitted through a load cell to measure the load transferred to the sample, via the means for retaining the lower part of the sample via the means for transmitting force via the spherical member, via a means for transferring and then via the load cell from a posterior housing of the sample holder which is forced together with the means for retaining the upper part of the window by a means for generating a force; and means for adjusting the known load.

2. A sample holder for confocal microscopy of a sample of chemical mechanical polishing pad samples according to claim 1 wherein the means for retaining an upper part of the transparent window is a window mounting ring affixed to the inside bottom of a cup placed over a posterior wall closed cylindrical housing and secured to a ring mounted on a stepped ledge in or alternatively part of said cylindrical housing, which transparent window ring may be opaque or transparent, and the open portion of which comprises a regular curved or polygonal geometric shape perpendicular to the direction of transmission, completely encompassed by the dimensions of the sample and the means for retaining the lower part of the sample comprising a sheet of hard material resting under the sample, pressing the sample opposite the transparent window, the said sheet of hard material corresponding approximately to the dimensions and geometric shape of the transparent portion of the window, and in which the means for transmitting force is a force transfer unit supported within the cup by spacing rings.

3. A sample holder of confocal microscopy of a sample of a chemical mechanical polishing pad at a known load according to claim 2 wherein the transparent window material comprises sapphire.

4. A sample holder of confocal microscopy of a sample of a chemical mechanical polishing pad according to claim 2 wherein the shape of the uncovered portion of the window is a circle.

5. A sample holder of confocal microscopy of a sample of a chemical mechanical polishing pad according to claim 2 wherein the geometric shape of the sheet of hard material corresponds precisely or is the same size as the geometric shape of the uncovered portion of the transparent window.

6. A sample holder of confocal microscopy of a sample of a chemical mechanical polishing pad according to claim 2 wherein the covering of the outer part of the transparent window is accomplished by a window mounting ring that comprises an opaque layer or plate surrounding the same and affixed to or resting on the inside of said cap covering the cup and apparatus.

7. A sample holder of confocal microscopy of a sample of a chemical mechanical polishing pad according to claim 2 wherein heat is applied to the sample.

8. A sample holder of confocal microscopy of a sample of a chemical mechanical polishing pad according to claim 7 wherein the said heat is applied to the sample by means of a heater external to a spindle of thermally conductive material surrounding the force transfer unit and supported by spacing rings.

9. A sample holder of confocal microscopy of a sample of a chemical mechanical polishing pad according to claim 8 wherein the heat is applied to the sample by a heater surrounding the thermally conductive portion of the spindle.

10. A sample holder of confocal microscopy of a sample of a chemical mechanical polishing pad according to claim 8 wherein the sample temperature is determined by a thermocouple.

11. A sample holder of confocal microscopy of a sample of a chemical mechanical polishing pad according to claim 2 wherein the load applied results in pressures on the transparent window in the range of 0 pounds per square inch to 11 pounds per square inch.

12. A sample holder of confocal microscopy of a sample of a chemical mechanical polishing pad according to claim 1 wherein the means for generating a force comprises a cup secured by spring compressed bolts through holes in a ring supported by an outward turning lip of the cup to threaded holes in a ring resting on a step in the cylindrical walls.

13. A sample holder for confocal microscopy of a sample of a chemical mechanical polishing pad at a known load according to claim 1 wherein the load is applied to the sample through the force transfer unit by means of a threaded shaft housed in a sliding tube, one end of which is affixed to the bottom of the cup, said threaded shaft passing through a fixed end hearing affixed to the other end of the said sliding tube, a threaded slider it within the tube with a single or concentric spring between the load cell and the shaft and a free end bearing sitting under the load cell and transferring load thereto.

14. A sample holder of confocal microscopy of a sample of a chemical mechanical polishing (CMP) pad according to claim 1 wherein the means for retaining an upper part of the transparent window is a window mounting ring affixed to or resting on the inside bottom surface of a cup placed over a posterior wall closed cylindrical housing and secured to a ring mounted on a stepped ledge in or alternatively part of the said cylindrical housing, which transparent window ring may be opaque or transparent, and the open portion of which comprises a regular curved or polygonal geometric shape perpendicular to the direction of transmission, completely encompassed by the dimensions of the sample and the means for retaining the lower part of the sample, comprising a sheet or hard material resting under the sample, pressing the lower part of the sample opposite the window, said sheet of hard material corresponding approximately to the dimensions and geometric shape of the transparent portion of the transparent window, and in which the means for transferring force comprises a force transfer unit supported within the cup by spacing rings.

15. A method for using a sample holder for confocal microscopy of a chemical mechanical polishing (CMP) pad sample cut or otherwise removed from either a new or used CMP pad that maintains a uniform load and pressure over the part of the sample visible to a confocal microscope by placing the sample behind a transparent window and holding it against the said window, the sample holder comprising:

means for retaining an upper part of the transparent window which has an offset adjacent the transparent window having the same or essentially the same refractive index as the sample so that when the sample is held against the transparent window, the edges of the sample are outside an outer edge of the transparent window;

means for retaining the lower part of the sample which presses the sample under a known load against the transparent window, which means possesses lateral dimensions the same as or less than the corresponding dimensions of the sample;

means for transmitting force via a spherical member pressed against the means for retaining the lower part of the sample, the force being transmitted through a load cell to measure the load transferred to the sample via the means for retaining the lower part of the sample via the means for transmitting force via the spherical member, via a means for transferring force and then via the load cell from a posterior housing of the sample holder which is forced together with the means for retaining the upper part of the window by a means for generating a force; and a means for adjusting the known load to view the sample of a new or used CMP pad by confocal microscope.

16. A method for using a sample holder for confocal microscopy of a chemical mechanical polishing pad sample according to claim 15 wherein the transparent window material comprises sapphire.

17. A method for using a sample holder fox confocal microscopy of a chemical mechanical polishing pad sample according to claim 15 wherein the shape of the uncovered portion of the window is a circle.

18. A method for using a sample holder for confocal microscopy of a chemical mechanical polishing pad sample according to claim 15 wherein the geometric shape of the sheet of hard material corresponds precisely or is the same size as the geometric shape of the uncovered portion of the transparent window.

19. A method of using a sample holder of confocal microscopy of a sample of chemical mechanical polishing pad according to claim 15 wherein the covering of the outer part of the transparent window is accomplished by a window mounting ring that comprises an opaque layer or plate surrounding the same and affixed to or resting on the inside of said cap covering the cup and apparatus.

20. A method of using a sample holder of confocal microscopy of a sample of a chemical mechanical polishing pad according to claim 15 wherein heat is applied to the sample.

21. A method for using a sample holder of confocal microscopy of a sample of a chemical mechanical polishing pad according to claim 20 wherein the said heat is applied to the sample by means of a heater external to a spindle of thermally conductive material surrounding the force transfer unit and supported by spacing rings.

22. A method for using a sample holder of confocal microscopy of a sample of a chemical mechanical polishing pad according to claim 21 wherein the heat is applied to the sample by a heater surrounding the thermally conductive portion of the spindle.

23. A method of using sample holder of confocal microscopy of a sample of a chemical mechanical polishing pad according to claim 22 wherein the means for generating force comprises a cup secured by spring compressed bolts through holes in a ring supported by an outward turning lip of the cup to threaded holes in a ring resting on a step in the cylindrical walls.

24. A method of using sample holder of confocal microscopy of a sample of a chemical mechanical polishing pad according to claim 21 wherein the sample temperature is determined by a thermocouple.

25. A method of using sample holder of confocal microscopy of a sample of a chemical mechanical polishing pad according to claim 15 wherein the load applied results in pressures on the transparent window in the range of 0 pounds per square inch to 11 pounds per square inch.

26. A method for observing a sample holder for confocal microscopy of a sample of a chemical mechanical polishing pad at a known load according to claim 15 wherein the load is applied to the sample through the force transfer unit by means of a threaded shaft housed in a sliding tube, one end of which is affixed to the bottom of the cup, said threaded shaft passing through a fixed end bearing affixed to the other end of the said sliding tube, a threaded slider it within the tube with a single or concentric spring between the load cell and the shaft and a free end bearing sitting under the load cell and transferring load thereto.

27. A method for observing a sample of a chemical mechanical polishing pad at a known load by confocal microscopy according to claim 15 wherein the means for turning the threaded shafts or bolts is mechanical or automated.

* * * * *